W. R. KLOEB
GAS HEATER.
APPLICATION FILED NOV. 7, 1910.
991,727.
Patented May 9, 1911.
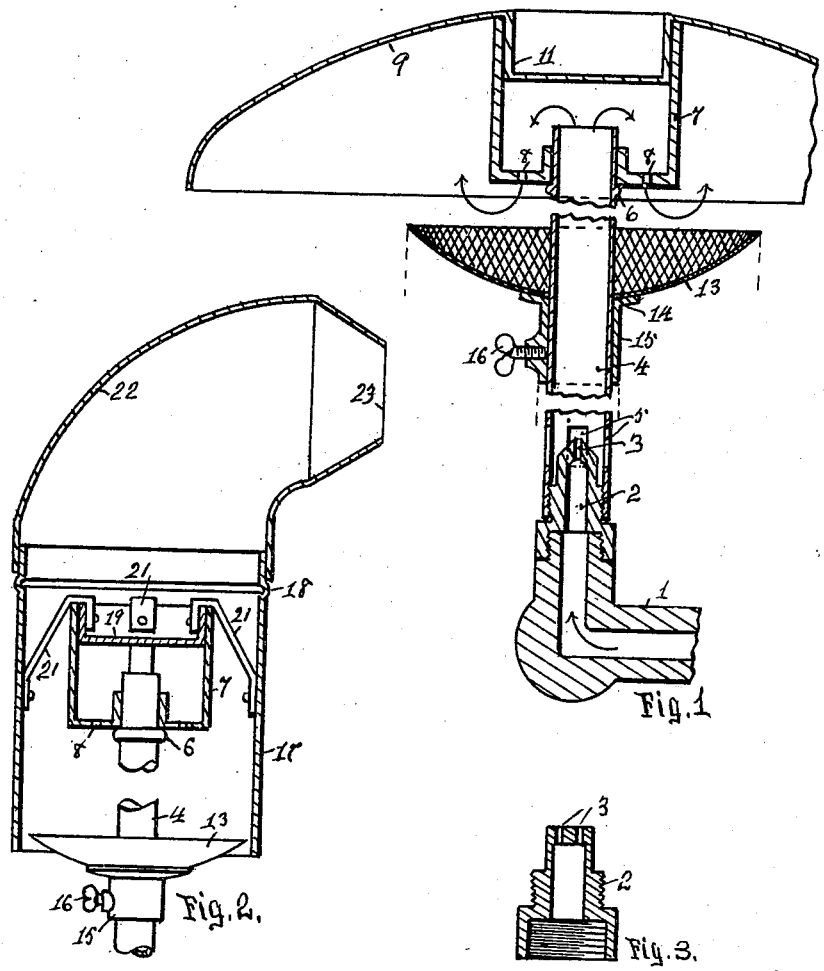

UNITED STATES PATENT OFFICE.

WILLIAM R. KLOEB, OF HAMILTON, OHIO, ASSIGNOR OF ONE-HALF TO ALPHONSE J. PATER, OF HAMILTON, OHIO.

GAS-HEATER.

991,727. Specification of Letters Patent. Patented May 9, 1911.

Application filed November 7, 1910. Serial No. 591,146.

*To all whom it may concern:*

Be it known that I, WILLIAM R. KLOEB, a citizen of the United States, residing at Hamilton, Ohio, have invented a new and useful Improvement in Gas-Heaters, of which the following is a specification.

My invention relates to gas heaters, and the objects of my improvements are to provide a gas jet with a removable heat radiator and also with an adjustable container for incandescent material; to provide a removable heat conductor and support for heating vessels; to provide a removable elbow for concentrating and discharging the heat in a horizontal direction for conveniently drying hair or for other suitable purposes, and to provide simple and durable construction with interchangeability of the different members for securing facility of operation and efficiency of action. These objects are attained in the following described manner as illustrated in the accompanying drawings, in which:—

Figure 1, is a vertical diametrical section of a gas heater embodying my improvements; Fig. 2, the heat conductor and the elbow in operative position on a burner, and Fig. 3 a removable nipple with a plurality of jet openings.

In the drawings 1 represents an ordinary gas bracket which may be either movable or fixed as desired and connected with a supply of gas under pressure. A nipple 2 formed with one or more jet openings 3 may be removably secured on the bracket. A mixing tube 4 removably secured on the nipple is formed with one or more air inlet openings 5 and with an annular shoulder or bead 6.

The cylindrical burner 7 removably encircles the upper portion of the mixing tube and is supported thereon by means of the bead 6. Said burner is formed with an open top and with a series of jet openings 8 through its bottom which openings may be either vertical or divergent in a downward direction. The metal heat radiator 9 in the form of an inverted concave pan is provided with a central depending boss 11 whereby it may be removably secured on the burner as shown in Fig. 1.

A concave pan 13 preferably of foraminous metal as shown in Fig. 1 is formed with a central opening 14 for the removable insertion therethrough of the mixing tube 4. A collar 15 provided with a clamping screw 16 is slidably adjustable on the mixing tube for maintaining the pan 13 in different positions of elevation. Said pan 13 serves as a container for fragments of incandescent mantles of Welsbach burners or other suitable incandescent material.

A tubular heat conductor 17 adapted to support a vessel and formed with an annular shoulder or bead 18 may be removably supported on the burner by means of a concentric boss 19 being secured therein by means of the upwardly convergent brackets 21 which facilitate the proper emplacement of the conductor in concentric relation to the burner. An elbow 22 formed with a convergent discharge opening 23 may be removably telescoped on the top of the conductor and in contact with the bead 18 for discharging the heat in a horizontal direction when desired.

In operation the gas is superheated within the burner in its passage from the mixing tube to the burner openings 8. Upon its discharge from said openings and being ignited the flame will diverge downwardly contact with and heat the material in pan 13 for producing light, thence radiate in an upward direction to contact with and heat the radiator by flowing in an outward direction thereunder. The pan 13 may be lowered out of contact with the flame when desired. By displacing the radiator with the heat conductor the heat of the burner may be thereby discharged under a vessel removably placed thereon and light may also be radiated from the foraminous pan. The elbow may be attached to the top of the heat conductor for concentrating and discharging the heat in a lateral direction to better adapt it to certain purposes.

Having fully described my improvements, what I claim as my invention and desire to secure by Letters Patent of the United States is:—

1. In a gas heater the combination of a vertical mixing tube, a burner removably supported on the top portion thereof, and formed with an open top and with a series of jet openings through its bottom, and a concavo-convex heat radiator formed with a central boss on its concave face adapted to be removably inserted in the top of the burner, for supporting the radiator thereon in an inverted position.

2. A gas heater comprising a mixing tube removably supported on a bracket, a burner removably supported thereon, interchangeable members adapted to be removably supported on the burner, and a container for incandescent material adjustably supported on the tube and under the burner.

3. A gas heater comprising a burner, a concave radiator supported in an inverted position thereover, and a container for incandescent material adjustably supported under the burner.

4. A gas heater comprising a nipple formed with one or more jet openings and adapted to be removably secured to a gas bracket, a mixer removably secured thereon, a burner formed with a superheating chamber and removably supported on the mixer, interchangeable members adapted to be removably supported on the burner, and a container for incandescent material adjustably supported on the mixer below the burner.

5. A gas heater comprising a vertical mixing tube, a burner supported thereon and formed with jet openings through its bottom, and a container for incandescent material adjustably supported on the tube under the burner.

WM. R. KLOEB.

Witnesses:
 HELEN NICHOLS,
 JOHN M. WISEMAN.

Copies of this patent may be obtained for five cents each, by addressing the "Commissioner of Patents, Washington, D. C."